US 6,614,598 B1

(12) United States Patent
Quake et al.

(10) Patent No.: US 6,614,598 B1
(45) Date of Patent: Sep. 2, 2003

(54) MICROLENSING PARTICLES AND APPLICATIONS

(75) Inventors: Stephen R. Quake, San Marino, CA (US); James P. Brody, Pasadena, CA (US)

(73) Assignee: Institute of Technology, California, Pasadena, CA (US)

( * ) Notice: Subject to any disclaimer, the term of this patent is extended or adjusted under 35 U.S.C. 154(b) by 0 days.

(21) Appl. No.: 09/441,152

(22) Filed: Nov. 12, 1999

Related U.S. Application Data
(60) Provisional application No. 60/108,385, filed on Nov. 12, 1998.

(51) Int. Cl.$^7$ .............................. G02B 3/00; G02B 6/32
(52) U.S. Cl. ....................... 359/664; 359/642; 359/656; 385/33; 385/35; 385/74
(58) Field of Search ................................ 359/642, 656, 359/664; 385/33, 35, 74

(56) References Cited

U.S. PATENT DOCUMENTS

| | | | | |
|---|---|---|---|---|
| 4,798,428 A | * | 1/1989 | Karim et al. ................... | 385/74 |
| 5,317,452 A | * | 5/1994 | Prentiss et al. .......... | 250/227.11 |
| 5,815,306 A | * | 9/1998 | SHeridon et al. ............ | 359/296 |

FOREIGN PATENT DOCUMENTS

JP 08-001810 A 1/1996

OTHER PUBLICATIONS

American Institute of Physics (1997), Photonic crystal properties of packed submicrometric $SiO_2$ spheres, by H. Miguez, et al. 3 pages.
Ann. Rev. Phys. Chem. (1985);36:379 406; "Fluorescence Correlation Spectroscopy and Photobleaching Recovery", by Elliot L. Elson.
Proc. Natl. Acad. Sci, USA. vol. 94, pp. 14433–14437, (Dec. 1997), "Absence of a barrier to backwards rotation of the bacterial flagellar motor demonstrated with optical tweezers", by Richard M. Berry et al..
Nature vol. 249, May 3, (1974); Flagellar rotation and the mechanism of bacterial motility, by Michal Silverman et al.
Cell, vol. 93, 21–24, Apr. 3, 1998, $F_1$–ATPase: A rotary motor made of a single molecule, by Kazuhiko Kinosita, Jr. et al.
Am. J. Phys. 67 (1), Jan. 1999, Inexpensive optical tweezers for undergraduate laboratories, by Stephen P. Smith, et al.
Nature, vol. 365, Oct. 21, 1993, Direct observation of kinesin stepping by optical trapping interferometry, by Karel Svoboda, et al.
Nature, vol. 368, Mar. 10, 1994, Single myosin molecule mechanics: piconewton foces and nanometre steps, by Jeffrey T. Finer, et al.
Science, vol. 264, May 6, 1994, Relaxation of a single DNA molecule observed by optical microscopy, by Thomas T. Perkins, et al.
Nature, vol. 393, Jun. 18, 1998, Dynein arms are oscillating force generators, by Chikako Shingyoji, et al.
Nature, vol. 248, May 3, 1974, Dynamic properties of bacterial flagellar motors, by Howard C. Berg.
Optics Letters, vol. 18, No. 5, Mar. 1, 1993, Aligning and attaching a lens to a optical fiber using light pressure force, by J. Mervis, et al.
Jameson et al., Time–Resolved Fluorescence in Biology and Biochemistry, David M. Jameson and Theodore L. Hazlett, Dept. of Biochemistry and Biophysics, John A. Burns School of Medicine, University of Hawaii, Chapter 4, pp. 105–133. No Date Available.

* cited by examiner

Primary Examiner—Evelyn Lester
(74) Attorney, Agent, or Firm—Townsend and Townsend and Crew LLP

(57) ABSTRACT

A microscopic lens, of size approximate 1 micron is used for its optical characteristics.

7 Claims, 4 Drawing Sheets

MICROLENSING PARTICLES AND APPLICATIONS

RELATED APPLICATIONS

This application claims the benefit of the U.S. Provisional Application No. 60/108,385, filed on Nov. 12, 1998.

GOVERNMENT CONTRACTS

The work described in -this application was supported by Grant No. PHY97-22417 awarded by the National Science Foundation.

BACKGROUND

Spherical polymer microspheres can be mass produced with extraordinary precision and low cost. Many uses for these microspheres have been developed that rely on the specific binding of a microsphere to a target, and the labelling of the polymer microsphere with various dyes or magnetic material.

Spherical glass lenses greater than 1 mm in diameter are used for coupling light into or out of fibers as well as for relaying images across a short distance.

The present application describes new optical applications of spherical polymer microspheres less than 10 microns in diameter.

SUMMARY

The present application teaches a special microlensing particle and applications of the particle. According to the present invention, a latex microsphere of diameter 0.3 μm–4 μm is obtained. Latex microspheres of this type are commercially available and have been used in pregnancy tests and other applications that do not exploit their optical properties.

According to the present system, the latex microsphere is preferably less than 10 μm in diameter, more preferably 1 to 2 μm in diameter. The latex microsphere is used in combination with an optical imaging element.

Applications of the latex microsphere include a micro lensing rotational probe for use in detecting high frequency rotational motion, a scanning microscope, and a diode laser collimator device.

BRIEF DESCRIPTION OF THE DRAWINGS

These and other aspects will now be described in detail with respect to the accompanying drawings, wherein.

DETAILED DESCRIPTION

Figure 1:
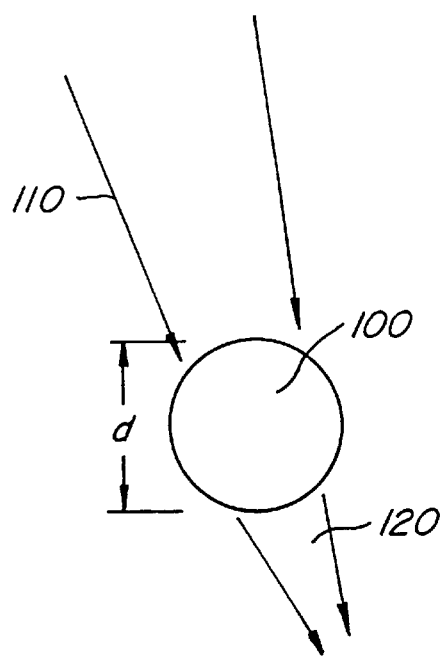
FIG. 1 shows a diagram of the optical microsphere.

FIG. 1 shows the use of a miniature optical element, e.g., a spheroid element, e.g. a microsphere, to change the characteristics of incoming light. The optical microsphere, 100 is a latex sphere or spheroid body, which has at least one round cross section, and in which the diameter D of the round cross section is between 0.8 and 2 um. More generally, the Latex particles of this type are commercially available from Bangs, or Interfacial Dynamics Corporation, or other companies.

It was found by the present inventors that the latex sphere has a collimating effect on incoming light. Incoming light 110 is collimated by the sphere into collimated light 120. The collimated light can be used for various purposes described herein.

Figure 2A:
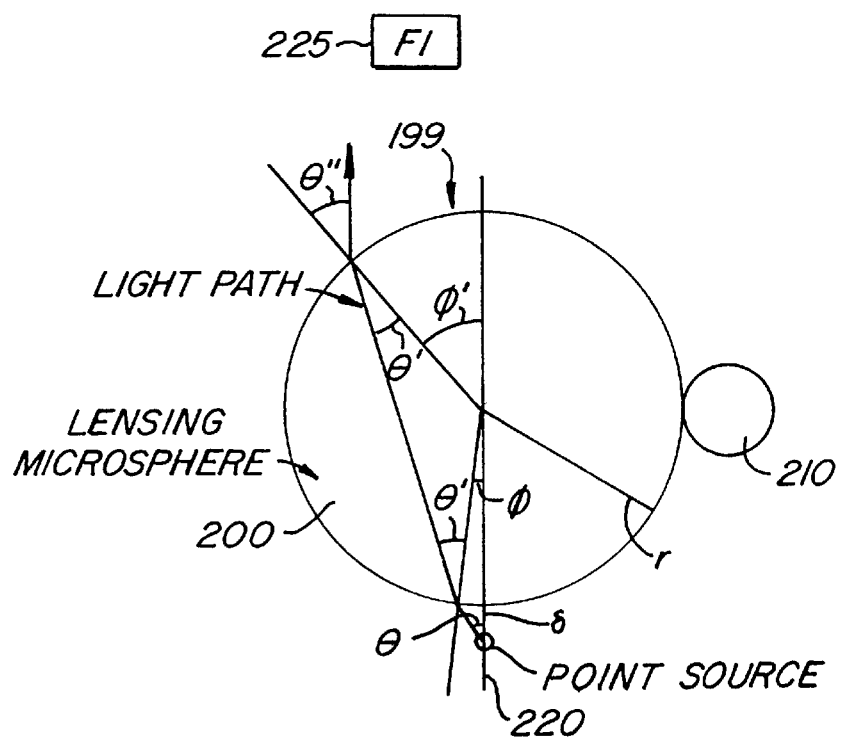
FIG. 2A shows optical ray tracing of dual microspheres.

A first embodiment is used to sense high frequency rotational motion. An asymmetric fluorescent probe is formed of a microsphere pair 199 as shown in FIG. 2A. The probe includes a first latex microsphere 200 in optical and physical contact with a second latex microsphere 210. The first microsphere 200 is approximately 1.1 μm in diameter and forms a lensing portion. The smaller microsphere 210, which can be between 0.5 um and 1 um, is fluorescently-labeled. The larger microsphere 200 acts as a lens that enhances the collection efficiency of the optical system.

The two microspheres are connected together. Light is passed by the optical combination of the two spheres. FIG. 2A shows optical ray tracing of the two microspheres. The ray originally starts at an angle θ relative to the vertical 220. After passing through the lensing microsphere 200, the ray continues at an angle φ'−θ". If the lens is in water, the index of refraction of the water, $n_1$, is 1.3. The microsphere 200 has an index of refraction, $n_2$, =1.59 (for polystyrene). A photodetector 225 monitors for the proper fluorescence from the marked sphere 210.

When the microsphere pair 199 is oriented relative to the photodetector 225 as shown in FIG. 2A, light passes through the flourescently-marked microsphere 210 directly to the photodetector 225, and a relatively dim signal of the marked sphere 210 is obtained.

Figure 2B:
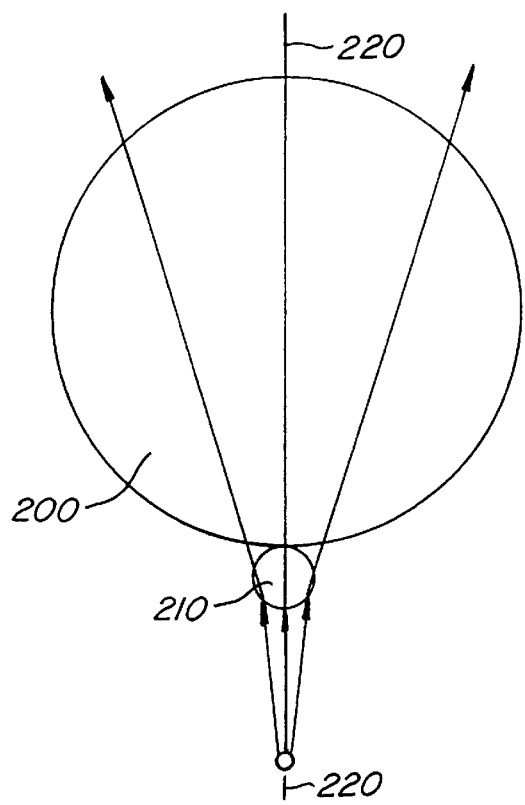
FIG. 2B shows the microspheres arranged in an enhanced signal mode.
Figure 2C:
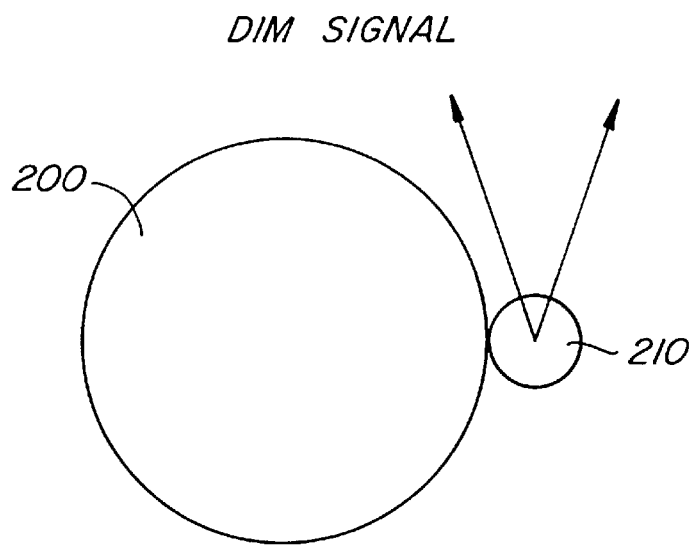
FIGS. 2C and 2D show schematic views illustrating the magnitude of the signal received based upon orientation of the microspheres of FIG. 2A and 2B, respectively.
Figure 2D:
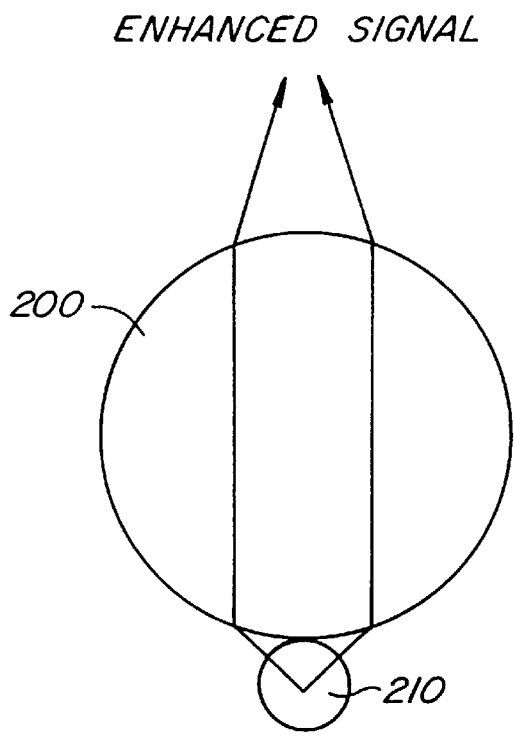

FIG. 2B shows the microsphere pair oriented in alignment with the optical collection axis 220. In this situation, the fluorescence from the marked microsphere, or objective 210 is enhanced by the lensing action of the lens 200. The amount of collected light indicative of the marked lens is enhanced. This can be seen according to a geometric optics argument, as indicated in FIGS. 2C and 2D, which show schematic views comparing the magnitude of the signal received based upon orientation of the microspheres of FIGS. 2A and 2B, respectively.

The angles of ray tracing are outlined in FIG. 2A The exit angle φ'−θ" can be calculated as a function of the incident angle θ. The fluorescent microsphere 210 is approximated as a point particle located a distance δ from the lensing microsphere. Using geometry, it can be seen that $$\phi' = \pi - (\pi 2\theta' + \phi) = 2\theta' - \phi$$

Applying Snell's law at the top interface of the lensing microsphere:

$$\theta'' = \sin^{-1}\left(\frac{n_2}{n_1}\sin\theta'\right)$$

where $n_2$ is the index of refraction of the lensing microsphere and $n_1$ is the index of refraction of the surrounding medium (typically water). Applying Snell's law at the bottom interface gives $$\theta' = \sin^{-1}\left(\frac{n_1}{n_2}\sin(\theta + \phi)\right)$$

Then, direct substitution of equation (3) into equation (2), shows that $$\theta'' = \phi + \theta$$

Using the law of sines, this can be rewritten as $$\frac{\sin(\pi - \theta - \phi)}{r + \delta} = \frac{\sin\theta}{r},$$

and then explicitly find the angle $\phi$ as a function of r, $\theta$, and $\delta$:

$$\phi(r, \theta, \delta) = \sin^{-1}\left(\frac{r+\delta}{r}\sin\theta\right) - \theta.$$

Finally, the exit angle $\phi'$−$\theta''$ can be written in terms of the original angle $\theta$, the radii of the two spheres, r, $\delta$, and the indices of refraction, $n_1$ and $n_2$.

$$\phi' - \theta''' = 2\sin^{-1}\left(\frac{n_1}{n_2}\sin(\theta + \phi(r, \theta, \delta))\right) - \theta - 2\phi(r, \theta, \delta).$$

For $\delta \ll t$, $\phi \ll \theta$. The exit angle is then given by $$\phi' - \theta'' = 2\sin^{-1}\left(\frac{n_1}{n_2}\sin\theta\right) - \theta.$$

Typical realizable values of $n_1$ and $n_2$ are for water, $n_1=1.3$ and polystyrene, $n^2=1.59$. For small $\theta$, the equation above reduces to $$\left(2\frac{n_1}{n_2} - 1\right)\theta.$$

This gives an exit angle of 0.64•$\theta$ for a ray entering at an angle $\theta$. Since the exit angle is always less than the original angle, the lensing microsphere focuses rays from the fluorescent microspheres and enhances the optical signal.

The enhancement in the observed optical signal also depends on the numerical aperture of the objective. The numerical aperture (NA) is defined as NA=n sin $\theta_0$, where $\theta_0$ is the collection angle. For the present objective (20x, 0.4 NA) in air $\theta_0=23.6°$. The equation shows that the focusing microsphere increases the angle of collection to 43.5°. This corresponds to an effective NA of 0.69. The epi-fluorescent intensity in proportional to $NA^4$, so the intensity enhancement should relate $(0.69/0.4)^4 \approx 9$ times.

Figure 3:
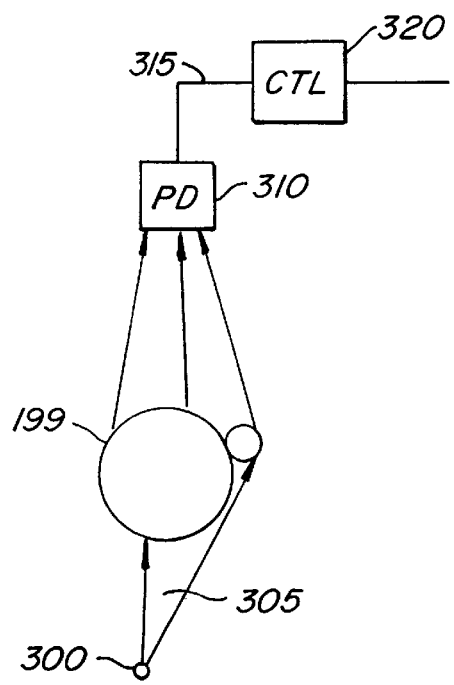
FIG. 3 shows a block diagram of the electronics used in the rotation detector.

FIG. 3 shows a block diagram of the electronics of the system. A light source 300 shines light along an optical axis 305. The microsphere pair 199 is located along this optical axis 305. Light which shines through the microsphere pair impinges on a photodetector 310 which produces a signal 315 indicative of the amount of incoming light. This signal 315 is coupled to a controller element 320 such as a processor. The processor measures the signal amplitude of the flourescently-marked portion of the light. From this amplitude, the processor calculates either an orientation angle of the pair 199, or more simply a signal indicative of the rate of change of that orientation angle.

The rate of change indicates the rate of rotation of the pair 199.

Figure 4:
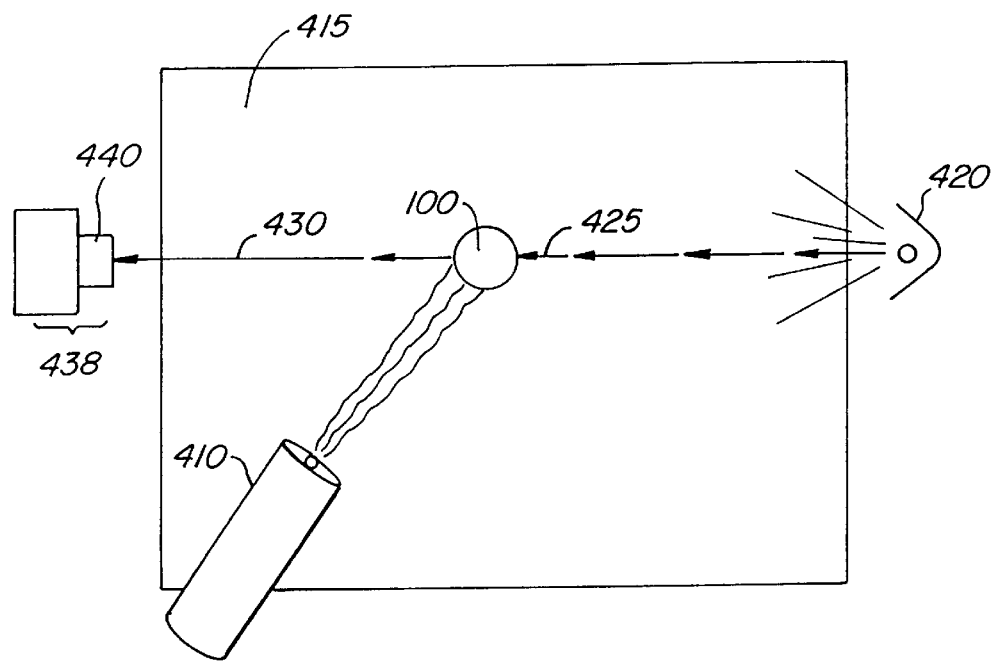
FIG. 4 shows an optical microscope formed with a microsphere lens.

The above has described one embodiment of these miniature lenses, but other applications are also possible. FIG. 4 shows the microlensing particle used in an optical scanning microscope. The microsphere lens 100 is held within optical tweezers over a surface 415 to be scanned. The lens is indexed by an indexer 410 to scan the device across the surface 415. The surface can be illuminated by a lamp 420, causing light to reflect off the surface. Alternatively, the light from lamp 420 can cause fluorescence of the materials on the surface 415.

The light reflected from the surface, shown as 425, produces an output 430 which is collimated when the microsphere is directly above the surface area being imaged. The microlens enhances the numerical aperture of the objective 440 of the microscope 438. This enables the microscope to have a high numerical aperture combined with a long working distance. Such a microscope avoids the usual trade off between light collecting capability (numerical aperture) and working distance.

In one mode, the microlens 100 can actually be smaller than the wavelength of light that is used. This allows the microscope to resolve at a resolution that is higher than the diffraction limit of the radiation.

Figure 5:
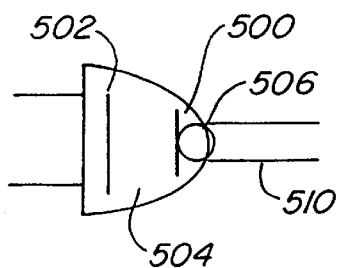
FIG. 5 shows a laser with a microsphere lens.

Another application of the microlens is shown in FIG. 5. Diode lasers are often small devices which produce a laser output over a very small scale. The laser output is often Gaussian.

A diode laser relies on two mirrors shown as 500 and 502 to form a lasing cavity 504. The present embodiment attaches microlens 506 directly on the output mirror 500. This helps collimate the laser beam 510. Moreover, since the laser itself is often on the order of size of 10 $\mu$m. a microscopic lens can help collimate almost all of the output light from the laser while minimally adding to the size of the laser.

Figure 6:
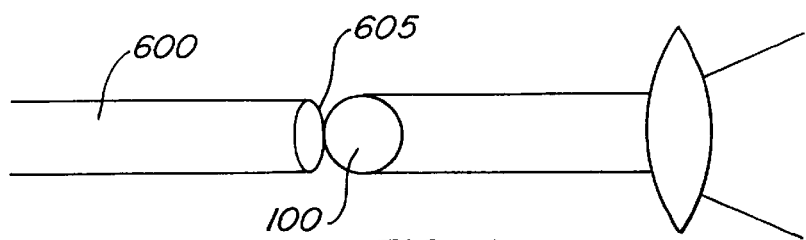
FIG. 6 shows a fiber with a microsphere lens.

FIG. 6 shows an optical fiber 600 using light collimated by a lens, to converge on the fiber end 605. In this embodiment, microsphere lens 100 is coupled directly onto the end of the fiber, and centered on the end of the fiber. The microsphere increases the effective numerical aperture and hence improves the coupling efficiency of the light.

In the embodiments of FIGS. 5 and 6, the lens can be attached to the desired surface, using a biochemical glue such as avidin or biotin, to hold the lens in place. Alternatively, the lens could be properly positioned with optical tweezers, and melted or welded into place.

Other modifications are contemplated.

What is claimed is:

1. A sensor comprising:
   first and second optical elements, each less than 10 $\mu$m in diameter;
   an optical sensor, receiving light that has passed through said first and second optical elements; and
   a processing element, processing said light to determine information about a spatial orientation of said first and second optical elements.

2. A sensor as in claim 1, wherein said processing element determines rotation.

3. A sensor as in claim 2, wherein said rotation is detected by intensity of light that is received.

4. A sensor as in claim 1, herein said second optical element has a different optical characteristic than said first optical element, the different optical characteristic determining an intensity of light collimated by the first optical element.

5. A sensor as in claim 4, wherein said different optical characteristic is fluorescence.

6. A sensor as in claim 4, herein the different optical characteristic comprises an angle of collection of incident light.

7. A sensor as in claim 4, herein the different optical characteristic comprises an index of refraction of incident light.

* * * * *

UNITED STATES PATENT AND TRADEMARK OFFICE
CERTIFICATE OF CORRECTION

PATENT NO.    : 6,614,598 B1
DATED         : September 2, 2003
INVENTOR(S)   : Stephen R. Quake et al.

It is certified that error appears in the above-identified patent and that said Letters Patent is hereby corrected as shown below:

<u>Title page,</u>
Item [73], Assignee, change "Institute of Technology, California" to -- California Institute of Technology --.

Signed and Sealed this

Twenty-third Day of March, 2004

JON W. DUDAS
*Acting Director of the United States Patent and Trademark Office*